United States Patent
Paulson

(10) Patent No.: US 7,568,762 B2
(45) Date of Patent: Aug. 4, 2009

(54) CHILDREN CAR SEAT COVER AND PROTECTIVE POUCH CUSHION

(76) Inventor: Megan Paulson, 595 Howard St, Ventura, CA (US) 94598

(*) Notice: Subject to any disclaimer, the term of this patent is extended or adjusted under 35 U.S.C. 154(b) by 0 days.

(21) Appl. No.: 11/462,674

(22) Filed: Aug. 28, 2006

(65) Prior Publication Data
US 2008/0073954 A1   Mar. 27, 2008

(51) Int. Cl.
*A47C 31/00*   (2006.01)
(52) U.S. Cl. ................................. 297/219.12
(58) Field of Classification Search ............ 297/219.12, 297/229
See application file for complete search history.

(56) References Cited

U.S. PATENT DOCUMENTS

| 6,926,359 B2* | 8/2005 | Runk ................. 297/219.12 X |
| D525,067 S | 7/2006 | Miller |
| 7,147,283 B2* | 12/2006 | Feist ..................... 297/219.12 |
| 2004/0207239 A1* | 10/2004 | King ..................... 297/219.12 |
| 2005/0200174 A1* | 9/2005 | Morgan et al. ...... 297/219.12 X |

OTHER PUBLICATIONS

Web site Covered in Love: www.coveredinlove.com Author: Kery Weber http://coveredinlove.com/index.php?cPath=2_3 Site by Dice Media Founded in Apr. 2001.

* cited by examiner

*Primary Examiner*—Anthony D. Barfield
(74) *Attorney, Agent, or Firm*—West & Associates, A PC; Stuart J. West; Charlotte Rodeen-Dickert

(57) ABSTRACT

The present disclosure provides a cover that can be removably applied to an infant or children's car seat. The seat cover is integral with a carry pouch that the car cover can be folded into and stored in when not in use. When the cover is thus stored in the pouch, it takes on the shape and feel of a cushion and can be used as such. The waterproof pouch can also facilitate the handling of a soiled seat cover.

13 Claims, 6 Drawing Sheets

CHILDREN CAR SEAT COVER AND PROTECTIVE POUCH CUSHION

FIELD OF THE INVENTION

The current disclosure relates to removable slipcovers for children's car seats.

BACKGROUND

Each year thousands of infants and young children are killed or injured in car crashes. Frequently, this can be prevented by always using infant or toddler car safety seats correctly. Many States have now passed laws requiring the use of car seats that are secured to the vehicle when transporting a child, depending on their weight and age.

Traditionally, child car seats are secured to a vehicle by means of the vehicle's built-in safety belts. Child passenger safety experts have developed several ways to make car safety seat installation safer, including LATCH (Lower Anchors and Tethers for Children), an attachment system that makes installing a car safety seat easier by eliminating the need to use seat belts to secure the car safety seat. It includes 2 sets of small bars, called anchors, located in the back seat where the cushions meet. Car safety seats that come with LATCH have a set of attachments that fasten to these vehicle anchors. However, unless both your vehicle and the car safety seat have this anchor system, you will still need to use seat belts to secure the car safety seat. Similarly, a tether is a strap that attaches a car safety seat to an anchor located on the rear window ledge, the back of the vehicle seat, or on the floor or ceiling of the vehicle. Tethers give extra protection by keeping the car safety seat and the child's head from moving too far forward in a crash or sudden stop. Tethers should not be confused with LATCH attachments, the tether is a longer strap at the top of the seat and LATCH attachments are located at or near the base of the seat. All new cars, minivans, and light trucks have been required to have tether anchors since September 2000. Most new forward-facing car safety seats and a few rear-facing car safety seats come with tethers.

No matter which method discussed above is used to secure a car seat to the vehicle, it can take ten to fifteen minutes to remove and the same amount of time to re-install the car seat. Further, great care must be given to inspect the installation to ensure the car seat is secured properly. Since children can have "accidents" in the car seat and make a mess while traveling, it becomes a frequent chore to remove the seat to clean it, and then perform the installation and inspection again. Frequent removal and re-installation of a car seat can greatly increase the chance of improper installation of the car seat, defeating its safety purpose.

Car seat covers have been made available to alleviate this messy problem. For example, car seat covers are available from Covered in Love, Inc. (www.coveredinlove.com) that cover infant and toddler seats. However, the toddler covers require the user to remove the car seat from the vehicle, turn the seat over, take the straps that come out of the back and pull them through the slots. Then the user has to slip the cover over the existing padded cover, and finally put straps back through the slots Similarly, U.S. Pat. No. 6,926,359 B2 to Runk discloses a child seat cover in the form of a pad with slots through the pad that facilitate removal and reinstallation of the cover. Some of the slots accommodate the seat safety harness and merge with side slots that are held closed by mating separable fastening elements. The side slots extend at least partially along the junction between the backrest portion and the side bolster portions of the pad. A pair of back slots extend from respective strap anchoring locations in the backrest region to respective side slots. A release slot is included at each side of the pad, extending from the respective side slot to the adjacent outer side edge of the cover. The Runk seat cover is over-complicated and can present a real challenge in applying to a car seat quickly.

Furthermore, there is one major drawback to having one single car seat cover only. When the child makes a mess in the seat, he or she would have to sit in the mess for the remainder of the excursion or risk soiling the seat directly if the seat cover is removed. While it is possible to carry a spare seat cover, the prior art covers are unwieldy and oddly shaped, requiring a separate bag or pouch to carry and takes up valuable space in the vehicle until it would be needed.

A solution is therefore desired for a car seat cover that can be easily applied to and removed from a children's car seat. It is also desired that this cover be compact and self-contained, and can serve an auxiliary function when it is not attached to the child seat. The car seat cover, when not in use, can become a small cushion that the child or any adult traveling in the vehicle can use for comfort. This facilitates keeping a spare car seat cover, or multiple covers, in the vehicle. When the occasion arises that a spare cover is needed, the soiled cover can be easily removed without removal of the car seat and the spare cover quickly applied. It is further desired that the soiled cover can be sealed into a waterproof self-contained pouch. The seat cover should be durable enough to be washed and dried in a household washing machine and dryer. The cover should be able to accommodate the different positioning of the shoulder and crotch harnesses, to be usable with children as they become older.

SUMMARY OF THE INVENTION

The present disclosure provides a cover that can be removably applied to a infant or children's car seat. The seat cover is integral with a carry pouch that the car cover can be folded into and stored in when not in use. When the cover is thus stored in the pouch, it takes on the shape and feel of a cushion and can be used as such. The waterproof pouch can also facilitates the handling of a soiled seat cover.

DETAILED DESCRIPTION

Figure 1:
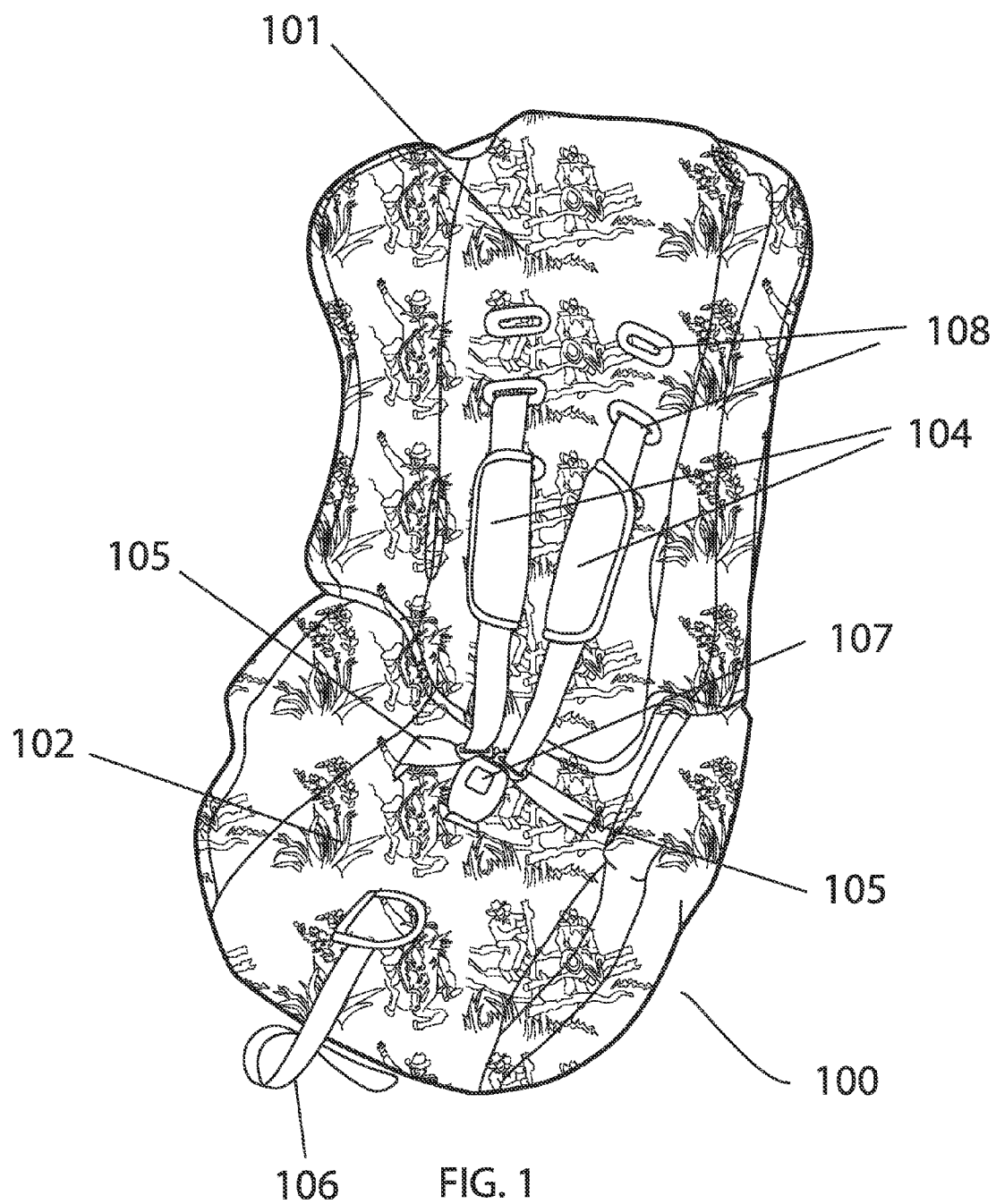
FIG. 1 depicts a common children's car seat with a 5-point harness.

FIG. 1 depicts a generic children's car seat 100 with a 5-point harness. The car seat has a seat back 101 in the top and a seat at the bottom 102. The 5-point harness has a webbing strap over each shoulder 104, a lap strap on each side of the pelvis 105, and one between the legs 106, with all five coming together at a common buckle 107. The shoulder harnesses pass through sets of guide apertures 108 situated in the seat back 101. The guide apertures 108 allow the shoulder straps 104 to be adjusted to different heights as a child grows older. Infant car seats (not shown) are also equipped with a similar 5-point harness. The harness assembly can be tightened and released with harness release strap 109. The novel car seat cover discussed herein is able to be universally applied to such standard, generic children's car seats as depicted in FIG. 1, with no regard to the manufacturer, model, or size of the seat. The car seat cover can also be manufactured to fit custom car seats if such seats have a shape or size that differs significantly from the norm. The children's car seat as depicted in FIG. 1 is shown here for illustration purposes only and is not meant to be limiting. In a similar vein, the car seat cover disclosed herein is also suitable for use with infant car seats.

Figure 2:
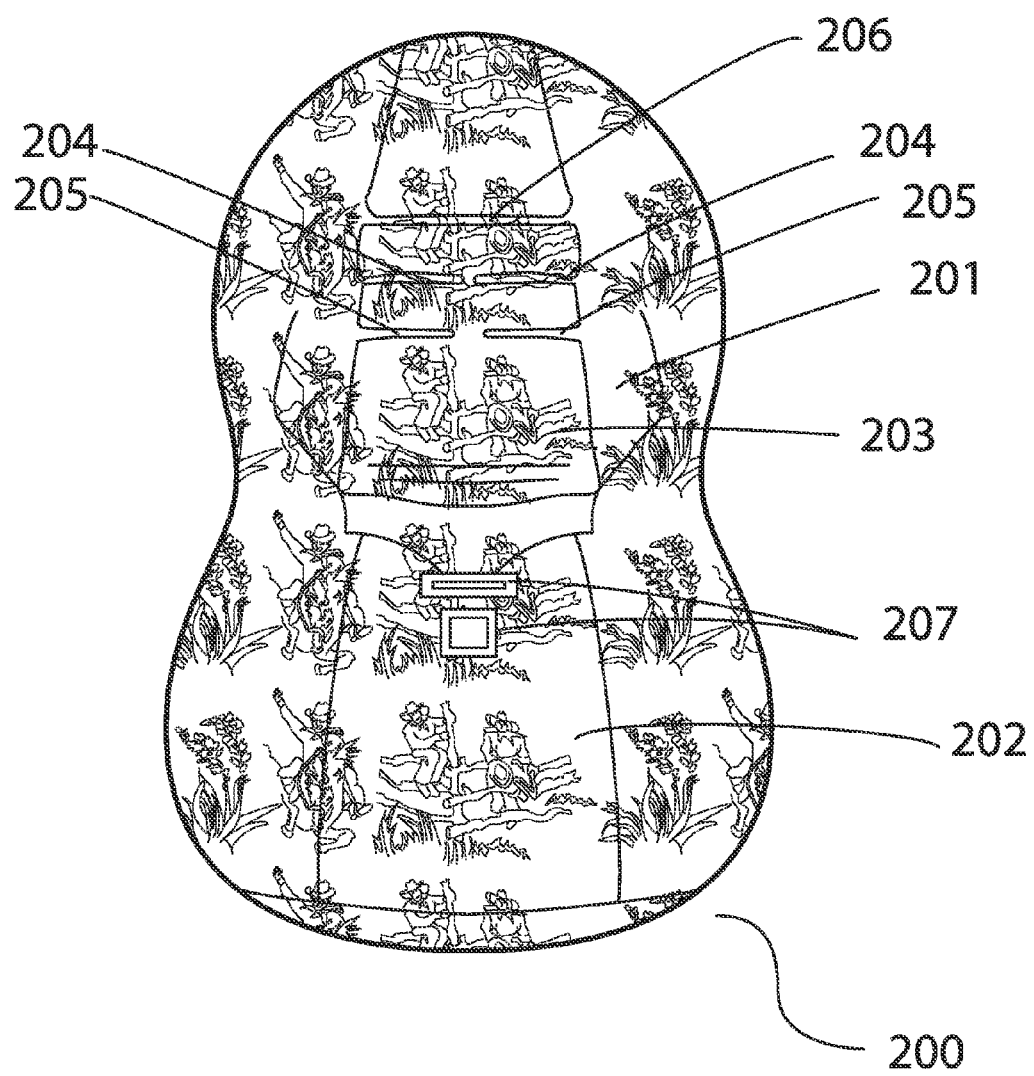
FIG. 2 depicts a front planar view of the car seat cover laid out on a flat surface, according to one embodiment of the disclosure.

FIG. 2 depicts a planar front view of an embodiment of the car seat cover 200 as it is laid out on a flat surface. The car seat cover 200 can be constructed of any soft cloth material convenient or known. The material can be imprinted with any design that is pleasing to the eye, and/or is attractive to children. The material chosen should be washable in a common household washer. It can further be coated with a water-resistant coating such as 3M Corporation's Scotchgard™ to enhance it soil-repellent characteristics. In one embodiment of the car seat cover, the material chosen has a soft padding so as to enhance the comfort of the child while using the car seat, and also to enhance the softness when the car seat is folded into a cushion form.

The cover 200 comprises a top portion 201 that is attachable to a seat back 101 of a children's car seat 100, and a bottom portion 202 that is attached to the seat portion 102 of the car seat 100. A "Quick-fit" flap 203 with sets of slits 204, 205 is located in the top portion 201 of the cover. The Quick-fit flap 203 is integral with the top portion 201 of the car seat cover, and opens and closes by folding the flap 203 along a cloth hinge 206. The cloth hinge 206 can be formed simply by thread stitches on the material. Alternatively, the Quick-fit flap can be made from a separate piece of material and attached to the top portion of the car seat cover by any means convenient or known. Opening 207 in the bottom portion 202 allows the harness common buckle 107 and the strap between the legs 106 to pass through. Similarly, opening 208 allows the harness release strap 109 to pass through.

Figure 3:
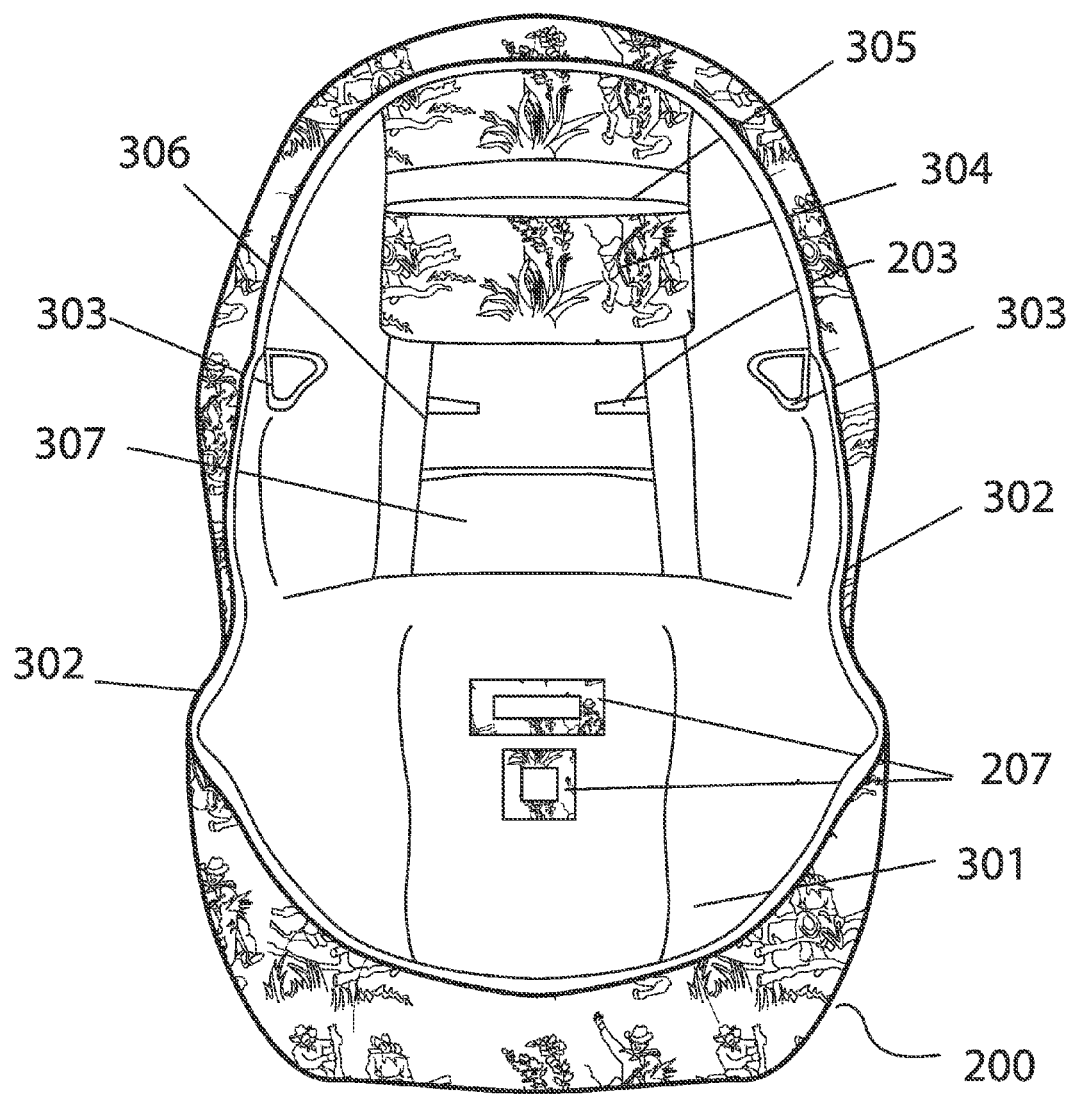
FIG. 3 depicts a back planar view of the car seat cover, laid spread out on a flat surface.

FIG. 3 depicts the back side of the car seat cover 200. The back side of the material used has a soft padding or quilted material 301 to enhance the softness of the car seat cover. The shape of the top 201 and bottom portions 202 of the car seat cover 200 conform to and can be fitted on a standard car seat 100. The car seat cover is lined with a bias tape 302 so that it can be slipped onto a car seat quickly and easily. In alternate embodiments of the car seat cover, an elastic band can be used in place of the bias tape. Loops 303 can also optionally be made available for sliding onto arm carriers of infant car seats to help hold the car seat cover 200 in place. The Quick-fit flap 203 can be seen through a harness opening 306 through the top portion of the car seat cover. The opening 306 is for easy assess to the car seat shoulder belts 104 in the front. Lap straps flap 307 is partially covered by Quick-fit flap 203 at the front of the car seat cover, and is held shut by means of mating with Velcro® strips or other similar means known or convenient on the Quick-fit flap. The lap straps flap 307 is accessible at the front by lifting the Quick-fit flap, and allows easy access to the lap straps 105.

Figure 4:
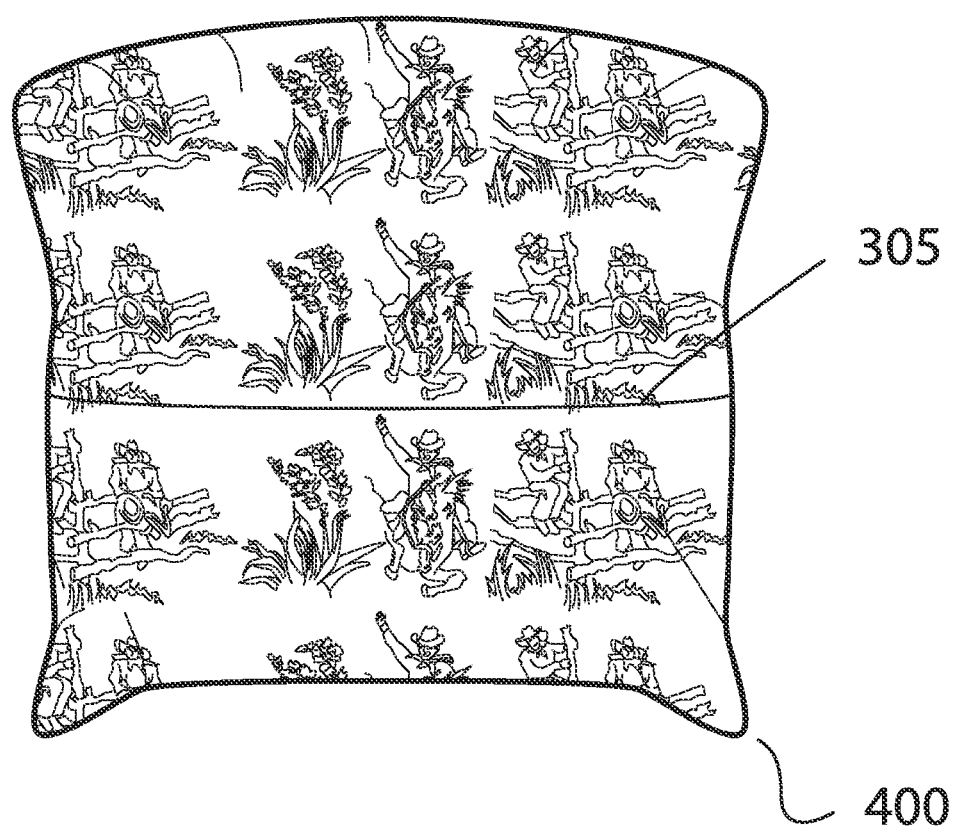
FIG. 4 depicts a view of the car seat in its cushion form.

The back of the car seat cover is integral with a carrying pouch 304. The pouch has a longitudinal opening flap 305 that runs along the length of one side of the pouch. The entire car seat cover 200 can be packed away by turning the pouch 304 inside out and folding the car seat cover into it. Refer to FIG. 4. When the car seat cover 200 is packed into the pouch 304, it becomes a small cushion 400 and can be used as such. The pouch can be lined with a waterproof and odor-resistant material, so that a soiled seat cover can be packed and sealed into the pouch to await cleaning after the excursion. The opening flap 305 can be lined with Velcro® or similar means known or convenient to hold it shut.

Figure 5:
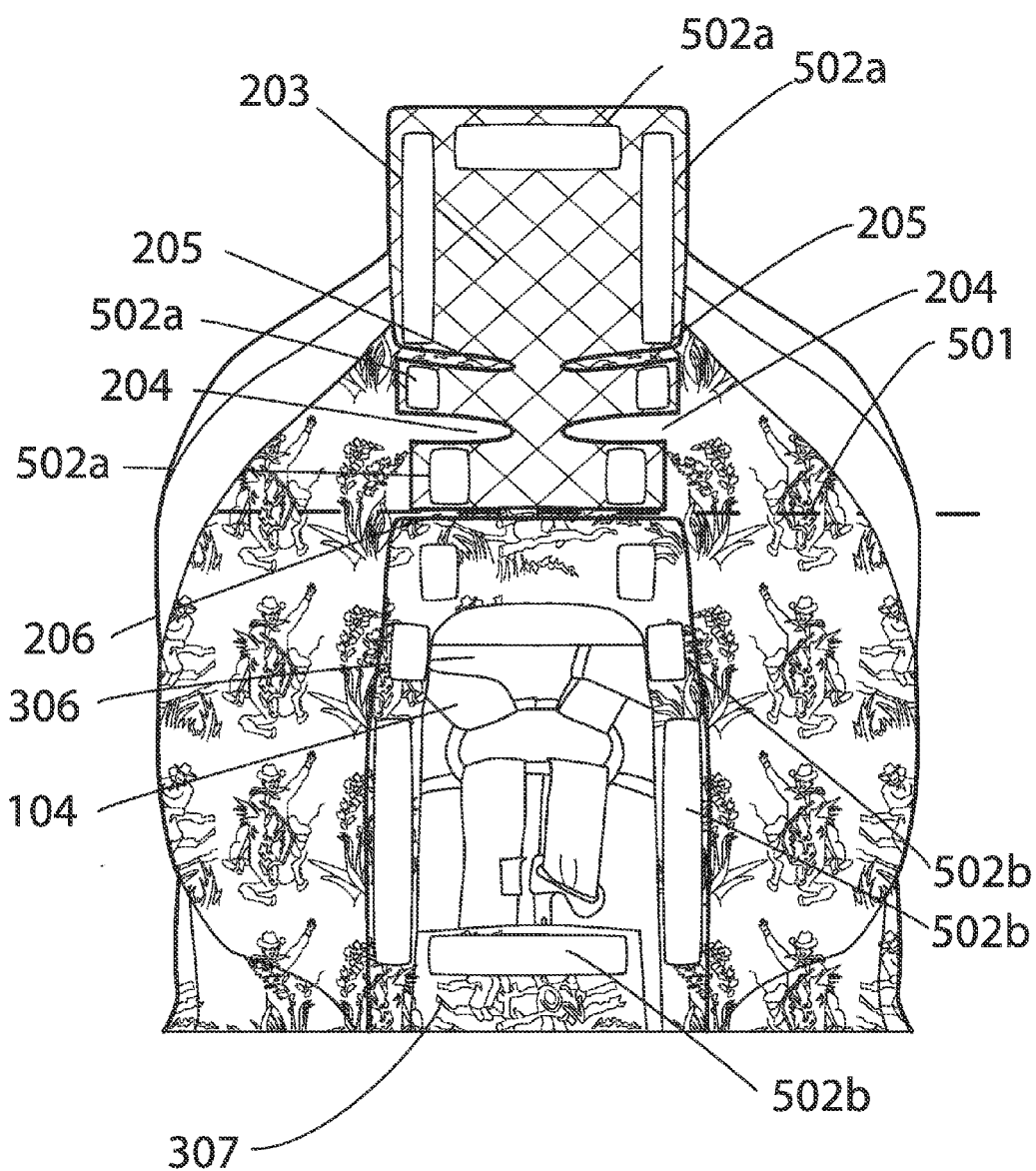
FIG. 5 depicts a close-up view of Quick-fit flap of the seat cover as the cover is applied to a car seat.

FIG. 5 depicts a close-up view of Quick-fit flap 203 of the seat cover in the open position, after the seat cover has been applied to a car seat. When the Quick-fit flap 203 is lifted up along the cloth hinge 206 and folded up along axis 5011 the car seat harness assembly can be easily assessed through the opening 306 in the car seat cover 201. The sets of slits 204, 205 correspond to the positioning of the shoulder strap guide apertures 108 on the car seat back 101. The shoulder belts 104 are passed through either slits 204 or 205 in the Quick-fit flap 203 depending on which set of guide apertures 108 were being used. The Quick-fit flap can then be folded down and closed. Velcro® strips 502a on the Quick-fit flap mate with matching strips 502b surrounding the harness opening 303 to hold the Quick-fit flap closed when the car seat cover 200 is applied to a car seat 100. The Quick-fit flap partially covers the lap strap flap 307 when closed and mates to a corresponding Velcro® strip 502b on the lap strap flap 307. In alternate embodiments of the car seat cover, buttons, straps, or similar means known or convenient can be used instead to close the Quick-fit flap.

Figure 6:
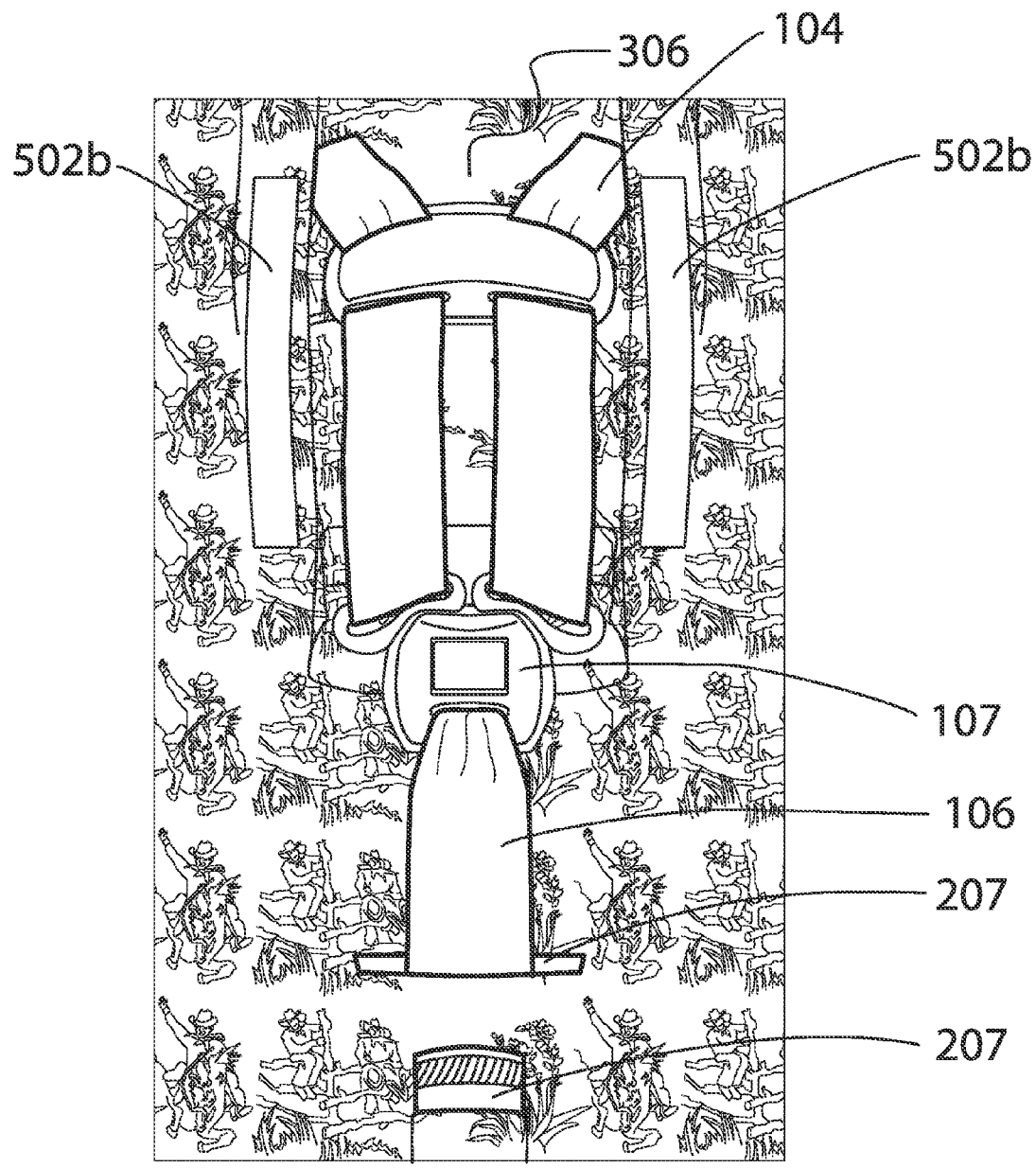
FIG. 6 depicts a close up view of the crotch belt openings as the cover is applied to a car seat.

FIG. 6 depicts in detailed view an area just below that shown in FIG. 5. Openings 207 in the bottom portion 202 allow the harness common buckle 107 and the strap between the legs 106 to pass through. Similarly, opening 208 allow access to the harness release strap 109.

Although the invention has been described in conjunction with specific embodiments thereof, it is evident that many alternatives, modifications and variations will be apparent to those skilled in the art. Accordingly, the apparatus as described and hereinafter claimed is intended to embrace all such alternatives, modifications and variations that fall within the spirit and broad scope of the appended claims.

What I claim is:

1. An apparatus for hygienic covering of a children's car seat, comprising:

a car seat cover sized and contoured to substantially conform to the front surface of a children's car seat and including a top portion to substantially cover the back of the seat and a bottom portion to substantially cover the seat bottom of the seat, said cover having at least one substantially central flap located on a front surface of the top portion, having a top edge and peripheral edges, that can open to allow access to a buckle assembly of said children's car seat, said flap being integrally attached with the top portion along the top edge of said flap and removably attached to the top portion along the remaining peripheral edges of said flap, said flap having a plurality of slots to allow shoulder belts of said harness assembly to pass through the car seat cover at different heights along a backrest of the children car's seat, said slots extending to edges of said flap wherein said slots are open at edges of said flap at least one flap allowing lap straps of the car seat to pass through, an opening through the bottom portion of the car seat cover allowing a crotch belt of the car seat to pass through, an opening through the bottom portion of the car seat cover allowing a harness release strap of the car seat to pass through, a pouch integral with the backside of the car seat cover, said pouch capable of holding the car seat cover within, wherein said car seat cover takes the form of a cushion when it is carried within said pouch.

2. The apparatus of claim 1, wherein the car seat cover is made of a washable material.

3. The apparatus of claim 1, wherein the car seat cover is made of a quilted material.

4. The apparatus of claim 1, wherein the car seat cover is made of a padded material.

5. The apparatus of claim 1, wherein said pouch can be turned inside-out.

6. The apparatus of claim 1, wherein said pouch is waterproof.

7. The apparatus of claim 1, wherein said pouch is odor-proof.

8. The apparatus of claim 1, wherein said pouch can be sealed to lock in odors and liquids.

9. The apparatus of claim 1, further comprising loops that can be attached to arm carriers of an infant's car seat.

10. The apparatus of claim 1, wherein said car seat cover can be folded into the attached pouch by turning said pouch inside-out.

11. The apparatus of claim 1, wherein said flap is held closed by hook and loop means.

12. The apparatus of claim 1, wherein said car seat cover is imprinted with a graphic design.

13. The apparatus of claim 1, wherein said car seat cover can be applied to an infant's car seat.

* * * * *